(12) United States Patent
Crossno

(10) Patent No.: US 9,349,270 B1
(45) Date of Patent: May 24, 2016

(54) METHOD AND APPARATUS FOR CONFIRMING AN ASSET IS ASSOCIATED WITH A GIVEN TRANSPORTATION STRUCTURE

(71) Applicant: Adam Crossno, Flower Mound, TX (US)

(72) Inventor: Adam Crossno, Flower Mound, TX (US)

(73) Assignee: OnAsset Intelligence, Inc., Irving, TX (US)

( * ) Notice: Subject to any disclaimer, the term of this patent is extended or adjusted under 35 U.S.C. 154(b) by 115 days.

(21) Appl. No.: 14/313,814

(22) Filed: Jun. 24, 2014

(51) Int. Cl.
*G08B 21/00* (2006.01)
*G08B 21/18* (2006.01)
*G08C 17/02* (2006.01)

(52) U.S. Cl.
CPC ............... *G08B 21/18* (2013.01); *G08C 17/02* (2013.01)

(58) Field of Classification Search
CPC .. G01S 13/825; G06Q 10/08; G08B 13/1427; G08B 13/2462; G08B 21/18; G08C 17/02
USPC ..................................................... 340/539.13
See application file for complete search history.

(56) References Cited

U.S. PATENT DOCUMENTS

| 5,959,568 | A | * | 9/1999 | Woolley | G01S 5/0289 235/385 |
| 2003/0224806 | A1 | * | 12/2003 | Hebron | H04W 24/00 455/457 |
| 2006/0267731 | A1 | * | 11/2006 | Chen | G06Q 10/08 340/10.1 |
| 2010/0214092 | A1 | * | 8/2010 | Mauro | G08B 25/10 340/539.1 |

* cited by examiner

*Primary Examiner* — Mark Rushing
(74) *Attorney, Agent, or Firm* — Bruce C. Lutz

(57) ABSTRACT

A method and apparatus is provided for establishing the whereabouts of an asset being tracked while in the process of being transported to a given destination. This may optionally be accomplished by utilizing identification beacons in the form of RF or other wireless transmitters to establish to a tracking system that a given asset is being transported via the appropriate structure in a pre-established schedule. Further, by knowing in advance that a given structure will be used for transportation or temporary storage, sensing parameters of smart tracking devices may be adjusted to better accommodate customer alert situations.

9 Claims, 2 Drawing Sheets

METHOD AND APPARATUS FOR CONFIRMING AN ASSET IS ASSOCIATED WITH A GIVEN TRANSPORTATION STRUCTURE

FIELD OF THE INVENTION

The present invention relates generally to an electronic device associated with an asset to be tracked or otherwise monitored and which electronic device is able to identify which specific structure is about to be used to contain that asset being monitored or tracked. Further logic is utilized to determine when the asset actually is loaded onto or within a transportation device or structure whereby a more detailed record of the location and conditions to which the electronic device and/or asset are subjected may be obtained while in the process of being transported to a final destination.

BACKGROUND

Many transportation vehicles presently include wireless tracking devices in the form of RF transceivers or at least transmitters utilized by transportation companies whereby the transportation company can monitor the progress of a given transportation vehicle en route to any given destination. Further, transportation companies upon learning of a new item to be transported can often times use the location information obtained to divert a nearby transportation vehicle to pick up the item on the way to a previously established destination.

It should be noted that transportation devices, as referenced throughout this document, include not only containers like briefcases, suitcases, boxes, envelopes, storage racks, cabinets, safes, refrigerators, insulated boxes, and the like, but also aircraft, box trucks, conventional railroad cars, seagoing vessels, intermodal containers, trailers, flatbed trailers and even the decks of ships transporting items loaded on deck as opposed to the hold of the ship. Thus, throughout this document the terms "transportation vehicle" as well as "transportation structures or devices" may refer to self-propelled vehicles as well as beacon or other wirelessly identifiable structures, entities, storage devices and various other enclosures that can be used in the total process of transporting an asset to and temporarily storing same for pickup by a customer in another location. In similar manner, a wirelessly identifiable structure may include not only a transportation device but may also refer to a location where an asset stored at an intermediate or final location in the overall transportation process.

While GPS enabled or other location determining tracking devices can report location of the tracking device when they are in an environment whereby appropriate RF signals can be detected and utilized to determine location, this location determining ability is often compromised when the tracking device is loaded into a transportation vehicle with many other assets. Both the structure of the transportation vehicle and the other assets can interfere with location determining circuitry whether it is GPS or other location determining algorithms known to those skilled in the art. Further, when the transportation vehicle is an aircraft, federal regulations presently prohibit RF transmissions in the cargo area of any commercial airline.

As is well known, many assets being transported today do not include an accompanying location aware tracking device and thus must rely on manual processes such as written recordation or bar code scanning in order to record when the asset is loaded into a transportation container and/or vehicle. Manual processes are prone to failure and in many cases such failure is not captured immediately in electronic systems whereby external parties may receive notifications. Thus the combination of manual processes and lack of real time data transfer can act to inhibit the accuracy, quality and velocity of asset transportation and routing throughout the global supply chain.

Although advance scheduling information may be obtained as to, especially in the matter of airlines, which specific transportation vehicle will be transporting a given asset, mistakes occur and assets are either lost, misplaced or for other reasons mishandled. Often, if such mistakes occur, the assets are transported on other vehicles which may present scheduling and chain of custody issues when managing time critical and highly valuable shipments.

Some tracking or monitoring devices include sensors. Such sensors may include temperature, shock and light and a record is kept in the tracking or monitoring device and/or is transmitted to a remotely located central station whereby the cause (or at least the likely cause) of any damage to the asset may be ascertained. A customer is especially interested in determining if damage occurs while loading or unloading a transportation vehicle, or within the custody of certain parties. Likewise shock events that occur during loading and unloading may present greater potential for harm to a given asset than shock events that may occur during transportation. Thus an interested party may desire a method to isolate certain handling or environmental events that occur while cargo is being loaded onto a truck versus events that occur along the highway while a transportation device, such as a truck, is in motion. As will be realized, pothole type shocks would only occur in the case of truck type transportation but not likely to occur when the transportation vehicle is an airplane, train or ship. Thus it would also be beneficial for a tracking device to have a way to ascertain the type of vehicle or container in which it has been loaded in order that its behavior may be modified or otherwise adapted to monitor certain events of interest that are unique to a given type of transportation vehicle and/or container. This adaptation of behavior may be instituted either by the electronic device or via a communication with a central station. A light sensor in a tracking device is often used to detect sudden changes in light level due to opening cargo doors or packages. When such light is sensed at locations other than scheduled stops or areas where a package is expected to be opened, the tracking device may attempt to transmit an alert that theft may be occurring. Such an alert transmission would be undesirable if the transportation vehicle happened to be a truck having a fiberglass roof that allowed a considerable amount of light into the cargo area during daytime transport.

While not all transportation vehicles include vehicle specific identifiable RF transmissions, short range or otherwise low power wireless signal transmitting beacons are available from many different sources. Some use a 433 MHz internationally free band slot. Others, such as proximity content delivery beacons known in the industry as iBeacons, use the Bluetooth frequency band. Thus, any transportation vehicle may readily be adapted to be easily identified when an RF or other wireless receiver is in reasonable proximity to a transportation vehicle having such a beacon. Likewise, any intermediate or final destination storage area can be equipped with a transmitter of signals whereby it becomes a wirelessly identifiable structure. As will be apparent to anyone skilled in the art, many various types of wireless technology may be employed in such scenarios.

It would thus be desirable to have tracking or monitoring devices be able to determine the identity and thus the specific vehicle into which the tracking device is being loaded or specific storage area of a structure that the tracking device is being placed and to be able to transmit that information to a remote central station. A further advantage of knowing that a tracking device is being transported by a specific vehicle permits tracking of the asset by knowing the location of the transportation vehicle even in situations such as airplanes where the tracking device itself is not permitted transmissions to a central station.

It would also be desirable to be able to modify the sensing parameters of the tracking device to be more suitable in reporting events to different environmental happenings or contingencies for each transportation vehicle and/or container used in the process of being delivered to a final destination.

Further it would be desirable to have access to an early warning alert that a tracking device has not been loaded onto a scheduled vehicle by a scheduled or otherwise anticipated date and/or time whereby steps can immediately be taken to rectify or minimize situational damage.

SUMMARY

The present invention utilizes circuitry in an electronic device associated with an asset to be transported. Such an electronic device may be a tracking device that is used to detect when it is in proximity to a wireless signal identifiable structure, whether that structure be a transport vehicle, device and/or container, and it ascertains which structure it is in proximity to by information stored in the tracking device and/or a remote central station via wireless communication transmission capability. The process of monitoring begins at the time the electronic device is associated with an asset to be delivered to a destination and continues until it is removed from the asset. Relative proximity data (strength of one or more received signals from said wireless signal identifiable transport vehicle, device or container) may also be used by the tracking device, as it is being moved amongst many wirelessly identifiable structures and transport devices, to determine which structure is presently containing the asset. At this time, sensing parameters of appropriate sensors may also be adjusted if appropriate to a given vehicle and/or situation. This determination of being loaded into a specific vehicle may be especially facilitated when one or more very low power beacons are used on the cargo loading doors and/or other portions of the loading area.

BRIEF DESCRIPTION OF THE DRAWINGS

For a more complete understanding of one or more embodiments of the present invention and the advantages thereof, reference is now made to the following descriptions taken in conjunction with the accompanying drawings, in which.

DETAILED DESCRIPTION

Figure 1:
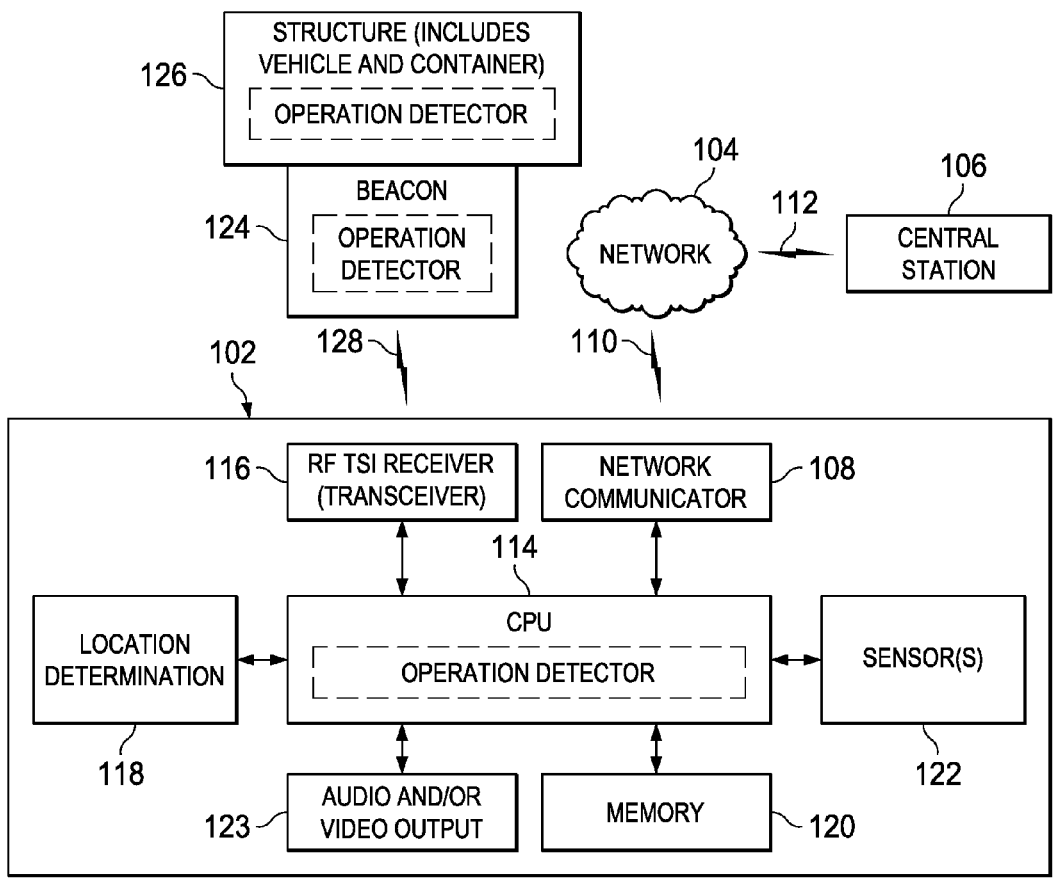
FIG. 1 is a block diagram presentation illustrative of at least one tracking device that is in proximity to an RF (or other wirelessly) identifiable structure such as a transport device and is able to communicate both with the identified structure and a central system.

While the present invention may be executed in many different formats for different situations, one embodiment of the present invention is described herein primarily as applied to electronic devices, such as tracking devices, associated with assets that are to be delivered to a scheduled destination by one or more transportation structures, devices or vehicles at least one of which can be specifically identified by wireless signals when the tracking or other electronic device is in proximity to the wireless signal identifiable structure or vehicle. While many different types of wireless signals such as RF frequencies, light wave frequencies, audio frequencies and so forth may be used, the invention as described herein will, for discussion purposes, utilize RF as the preferred embodiment. The electronic or other tracking device, as used in some variations of this invention, may also be described as a smart RFID tag. In the RFID tag industry, a normal RFID tag is responsive to a reader whereas a smart RFID tag includes some kind of computing power whereby it can do more than just respond to a reader. In other words, smart tags may respond only to readers of a certain type, at a certain location or only in connection with other specified parameters. Further, smart tags may include sensors and storage means for storing sensed data to be provided to readers at some later date.

It will be apparent to one skilled in the art that the invention also teaches a method to wirelessly confirm that certain assets are loaded into/onto certain vehicles and/or containers. As explained above, many transportation vehicles today include their own ability to track their location (for example a GPS tracking system is common on many commercially operated trucks and/or tractors today). The methods disclosed in this invention can easily be adapted to provide wireless confirmation that certain assets have been loaded into a given vehicle or container, and then a central station can be notified of this event. The central station can then associate the location tracking information from the mentioned tracking system on the vehicle in order to accomplish the function of tracking the asset since its presence onboard the vehicle has been wirelessly confirmed. In other words, the location of the vehicle is considered to be the location of the asset until other data is obtained from the tracking device that it is no longer associated with the previously indicated transportation vehicle.

The system as shown is readily adaptable for use in conjunction with any mode of transportation including airplanes, railroad cars, ships and so forth. While the explanation of operation concentrates on well-known satellite and cell phone tower type communications, the concept presented is readily adaptable to any other wireless technology instead of or in addition to satellite and cell phone tower type wireless communications and specifically including wide area and local area wireless technologies. Wireless tracking and/or monitoring devices referenced hereinafter operate in a manner substantially identical with a cell phone, tablet, computer and other wireless devices using wireless telephone transmission capability for communication with other devices and are intended to be included when the terms "cell phone type device" or mobile wireless communication type devices are utilized in the specification or claims.

Referring now to FIG. 1 illustrating one preferred embodiment of the invention, a single beacon detecting device generally designated as 102, that in a preferred embodiment of usage will further include asset tracking capability, is shown as communicating via a network 104 to a central station or central CPU 106. As illustrated, a network communicator 108 within a beacon detecting or tracking device 102 uses a communication link 110 to access the network and a communication link 112 is utilized from the network to the central station 106 (which may be any or all of a CPU, dispatch center, system user, personnel and so forth). Within the tracking device 102, a CPU 114 communicates not only with network communicator 108 but also with an RF TSI (Transport Structure Identification) receiver 116, a location determination circuit 118, a memory device or set of devices 120 and a plurality of sensors generally indicated as 122 as well as an audio and/or video output block 123 that may be used for alerting problems or otherwise to inform transportation personnel of special situations. It should be noted that, in certain embodiments of the invention, the functions or circuits of one or more of network communicator 108, RF TSI receiver 116 and location determination 118 blocks may be combined. The TSI receiver 116 communicates with one or more beacons 124 each of which is associated with a transport vehicle and/or container 126 by an available wireless communication link shown as 128. While, for convenience in describing one embodiment of the invention, the device 116 is primarily termed a receiver, there may well be instances when it is more appropriate to use a transceiver whereby instructions can be sent to the beacon to modify its operation such as when the beacon is associated with an aircraft and the beacon needs to be disabled from transmitting during flight of the aircraft. Further, although a preferred embodiment uses radio frequencies, any wireless signal receiver using frequencies above or below radio frequencies may be utilized in appropriate circumstances. While a preferred embodiment of the invention utilizes circuitry within tracking device 102 that may operate to detect operational status of a transportation vehicle, as will be further described in connection with blocks 224-234 of FIG. 2 to be described later, this detection may optionally be part of either the transportation vehicle 126 or the beacon 124 as shown by the dash line blocks labeled "Operation Detector" and appropriate data communicated to the tracking device via transmission link 128.

Although only one tracking device 102 is illustrated in FIG. 1 that may be in the process of being loaded into a transport vehicle, in actual practice it is likely that many different tracking devices would be simultaneously reporting to the central station 106 that they are being loaded either into/onto the vehicle 126 or some other transport vehicle or wirelessly identifiable structure that is able to report to the central station 106 through network 104. While the central station would typically include one or more data storage devices, the storage of the data reported to the central station could well be physically located at one or more locations remote from the central station 106. While typically network 104 is conveniently a part of the Internet system, the network may be any other communication available such as cell phone communication directly to appropriate circuitry or personnel in the central station 106 where the network is or comprises telephonic type communication technology. In similar manner while location determination block 118 would in many cases use satellite GPS (ground position satellite) capability, location may be obtained by many other means such as triangulation with cell phone or other communication towers or by many other means known to those skilled in the art of location determination. The communication detail, such as an arrow similar to 128, with the satellites or whatever location determining means is used by block 118 has been omitted to reduce clutter in the FIG. 1 presentation.

Figure 2:
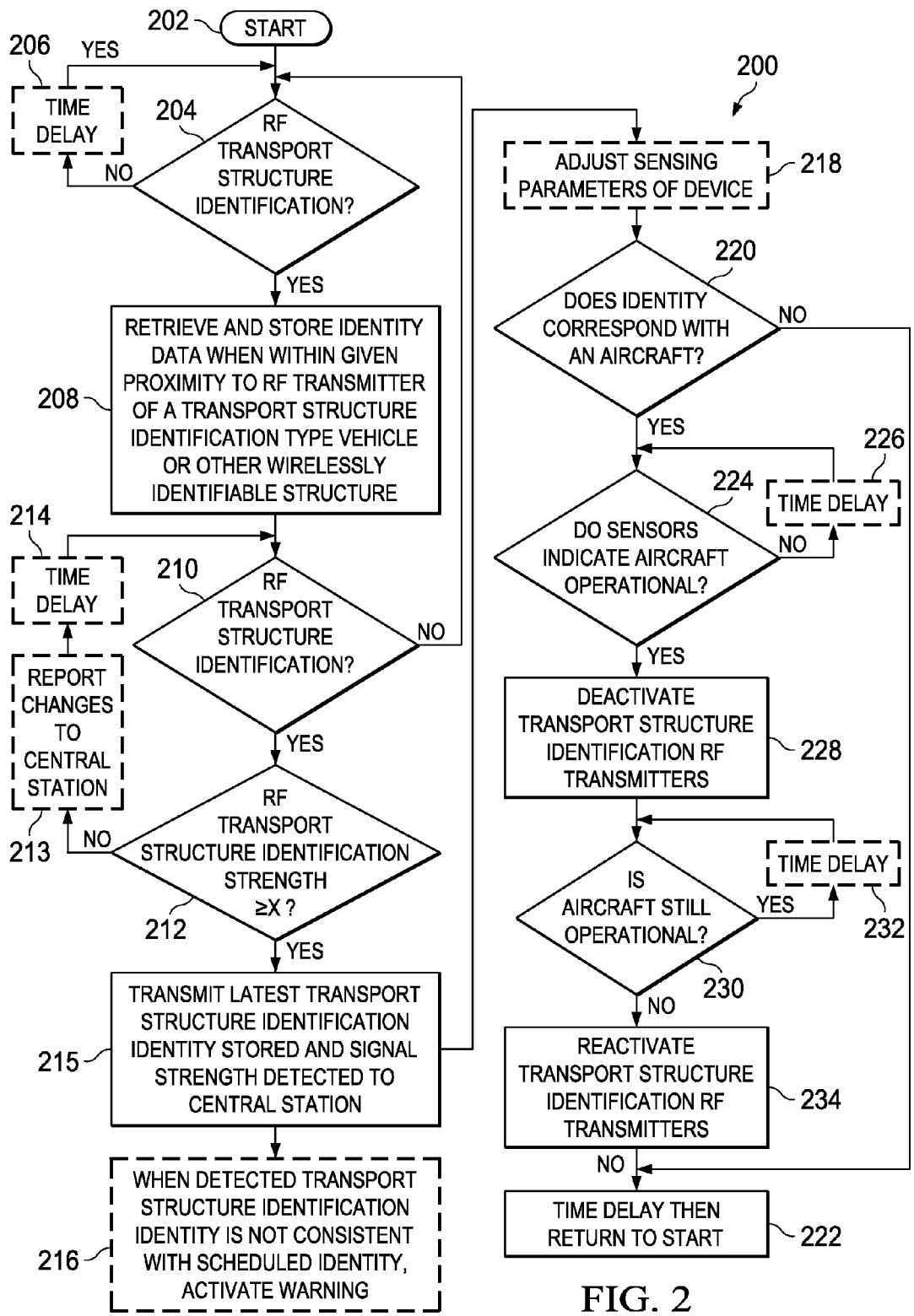
FIG. 2 is a flow diagram illustrative of a portion of a program used in a tracking device to detect identifiable structures such as transport vehicles and storage locations and adjust at least sensing parameters of the tracking device in accordance with known parameters of the identified structure.

Although the operation of FIG. 1 is believed apparent as shown and especially in conjunction with FIG. 2, a preferred embodiment of the tracking device 102 periodically reports location, as determined by location determination block 118, to the central CPU 106. Whenever the tracking device 102 detects a transportation vehicle or other structure that emits an identification signal, the tracking device 102 records that identity and compares the identity of that entity with the identity of transportation structures or devices previously determined to be used in the process for transportation to a given destination. This comparison may be done by stored information in the tracking device 102 or by communication with central CPU 106. The tracking device 102 may detect and record the occurrence of many different transportation vehicles before detecting a transportation vehicle consistent with the data set forth in the schedule. When the tracking device 102 detects that the strength of a detected signal of a nearby transportation vehicle exceeds a given value, the tracking device will assume that it is being loaded into the transport vehicle emitting that signal. This determination or assumption can be assured or negated by other sensed parameters such as movement, shock and so forth. Once a determination is made by the tracking device 102 that it is likely being loaded into a given nearby transport vehicle, such likelihood data is transmitted to the central CPU 106. The central CPU 106 may then use other means to determine the location of the transportation vehicle such as 126 in the event that it cannot contact tracking device 102. When the tracking device 102 is unloaded from transportation vehicle 126, it will again inform central CPU 106 that it is no longer being transported by that vehicle. If the schedule is such that it was to be further transported by another vehicle, the tracking device 102 will again report any detected nearby wirelessly identifiable structures or transport vehicles in the vicinity of the tracking device 102. As will be realized, there may well be instances of error in the assumption by 102 that it is being loaded into a transportation vehicle 126 if tracking device 102 then continues to report to central CPU 106 and/or reports being in proximity to another wirelessly identifiable transportation vehicle or structure.

Referring now to FIG. 2, a flow diagram of operation of a portion of the computer program utilized in the tracking device 102 is designated as 200 with a start block 202. In step 204, the program first checks to see if there is a transportation structure (vehicle or other device) that is close enough to be detected and whose identity can be determined. If none exists, the program proceeds to an optional time delay 206 before checking again. In a preferred embodiment of this invention, the periodic time delay is typically adjusted in accordance with whether or not the sensors in the tracking device have determined whether or not the tracking device is moving. In other words, if the device is not moving at all, the time delay in 206 may be drastically increased to reduce usage of battery power until some movement is again detected. On the other hand, if the movement is consistent with the tracking device being carried by a human, the time delay might well be different than if it is detected that the movement is consistent with being moved by a type of trailer such as used in airports if the next scheduled transportation vehicle is an airplane and might well be different again if the movement detected is consistent with a fork lift type vehicle that would be part of a final loading process if again the scheduled vehicle in close proximity is an airplane. Likewise, if the next scheduled structure is a truck and especially if a transportation vehicle has been detected that is consistent with the identity of a truck, the time delay may be adjusted to a value consistent with package conveyance items at a truck stop or even as specific as a truck stop at a given detected location. Furthermore, as wireless technology becomes more power efficient, the time delay may not be required at all, and the present invention should not be limited to incorporation of such an optional time delay.

When a nearby wirelessly identifiable transportation or temporary storage structure is close enough to be detected in decision block 204, the program proceeds to block 208 to retrieve and store any identity data available. The program then proceeds to a decision block 210. In decision block 210, a further check is made to see if the detected structure or transportation vehicle is still being detected. If it is not, the program returns to the start block 202 to check further. On the other hand, if the structure or transportation vehicle is still being detected, the program proceeds to a decision block 212 to see if the strength of the received signal is such that the tracking device 102 is in very close proximity to the detected structure. As set forth in the drawing, this decision is made if the strength of the received signal is equal to or greater than X. If it is not, the program returns to decision block 210. Optionally the reporting block 213, along with a time delay block 214, is illustrated between the output of decision block 212 and decision block 210 that may or may not be utilized depending upon various situations and/or other sensed conditions. The optional block 213 may advantageously be used in situations where it has been determined that it is desirable to identify all transportation devices identified by the electronic device associated with an asset. Information reported to a central station may include not only the identity of nearby transportation and temporary storage structures but also may report the signal strength and whether or not the signal strength is increasing or decreasing. If it is increasing and suddenly transmissions from the electronic (tracking) device are no longer received by the central station, even though the signal strength never increases to the value of X, it may be logically assumed by either or both of the electronic (tracking) device and the central station that the electronic device and its associated asset is within the confines of the latest detected transportation structure and can no longer contact the central station 106. On the other hand, if the decision block 212 ascertains that the strength exceeds a predetermined value, the program will proceed to block 215 which will cause the transmission of the TSI (Traveling Structure Identity (or Indentification)) that has been stored and the signal strength detected to be transmitted to the central station 106 in a manner similar to that when optional block 213 is used.

The tracking or other wireless identity reading device may include audio and/or video display capability in the form of speakers or human readable type display. If it is determined either by the tracking device or in conjunction with communication with a central station that the identity of the structure detected is not consistent with a transportation structure schedule previously obtained, a warning may be activated as shown in optional block 216.

Regardless of whether or not the actions of optional block 216 are activated, the program advances to an optional block 218 where any sensing parameters of the device are adjusted if appropriate for the identified transport vehicle into which loading is presently occurring. The program then advances to a decision block 220 to determine whether or not the identified structure is in fact an aircraft (or other structure requiring operational details). If it is not, the program advances to exit block 222 which after some appropriate time delay returns the program to start block 202.

If however the structure into which the tracking device is being loaded is an aircraft (or other vehicle or container type whereby certain wireless transmission technology cannot be used in various conditions due to regulatory or other environmental requirements), the program, rather than exiting continues to a decision block 224 to ascertain whether or not sensors indicate that the aircraft or other transportation vehicle is operational. Although optional, as shown, a time delay block 226 is utilized if the decision block 224 determines that the aircraft is not operational and, at the end of the time delay, block 224 again checks for operability. Once it is determined, in block 224, that the aircraft is operational, the program proceeds to 228 to deactivate any appropriate RF TSI transmitters in the situation where there are special beacons located in the cargo area and used in conjunction with the loading process to comply with present FAA regulations prohibiting active RF transmitters in the cargo area of an operational airplane. The program then continues to a decision block 230 to check the sensors to determine whether or not the aircraft or other transportation vehicle is still operational. If it is determined that it is still operational, the program continues to an optional time delay 232 and cycles through this process until such time as decision block 230 determines that the transportation structure is no longer operational. At this time, the local beacons in the cargo area are reactivated for use in any further loading or unloading process of the aircraft as set forth in a block 234. The program then returns to time delay and return block 222. It will be apparent to those skilled in the art that the function of decision blocks 224-234 (the determination of whether the transportation vehicle is operational and associated actions) may occur in any of the tracking device 102, the TSI beacon 124 or the transportation vehicle 126 and is set forth in each of these blocks in FIG. 1 as an optional block labeled "Operation Detector". Furthermore, the process described for reactivating the beacon 124 may occur via a broadcast command from tracking device 102 to beacon 124 wherein the beacon 124 enters a receive-only mode upon determination by the tracking device that the transportation structure has entered an operational state where transmissions from beacon 124 should be suppressed. Following the initial deactivation of its transmitter, beacon 124 would enter a receive-only mode and "listen" for a reactivation command from tracking device 102 once a determination has been made that it is safe to resume transmission. In addition, it should be noted that the determination of when to suppress and resume transmission of beacon 124 could be made by tracking device 102, the beacon 124 itself or circuitry for that purpose built into the transportation structure 126 depending upon the implemented embodiment of the invention.

As mentioned previously, typically it is expected that the beacon or other identity detecting device 102 will accompany an asset from a starting point to a final destination of the asset (delivery to a final customer) and include tracking capability to potentially inform the sender of the asset or the customer receiving the asset to ascertain where the asset is located at any given time. However, the beacon detector 102 may well also be used to only make sure that the asset is loaded into or onto a specific transportation vehicle, inform the entity loading the asset into the vehicle that the action was approved by some means such as a light or communication indication and then be removed from the asset for the next use of that device 102 to provide such a loading function again. In such a usage, the tracking capability could in many instances be removed from or deactivated within device 102.

The determination of whether or not an aircraft is operational can be made in many forms including engine vibration, signal frequency transmissions from the aircraft and so forth as well known to those skilled in the art and as practiced using tracking devices sold by the present assignee. As set forth above, the determination of aircraft operation can be made in the tracking device 102 or the TSI beacon 124.

While the wireless signals as illustrated in the embodiment described are shown as RF, they could be any of many other wireless frequency signals above and below RF such as light frequencies and audio frequencies.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A portable electronic device for accompanying an asset that is in the process of being delivered to a given destination comprising:
    wireless signal detection circuitry operable to wirelessly identify a nearby wirelessly identifiable structure;
    transmission circuitry operable to inform a remotely located data storage device that said electronic device is presently in proximity to a structure that is at least one of (a) a nearby wirelessly identifiable transportation device most recently identified, (b) a nearby wirelessly identifiable transportation device in closest proximity and (c) a nearby wirelessly identifiable temporary storage location;
    sensing circuitry operable to detect conditions consistent with at least one operational state of a nearby wirelessly identifiable structure subsequent to said structure being identified as a transportation device; and
    deactivation circuitry operable to transmit signals to deactivate at least one RF identifiable transmitter of said transportation device during said at least one operational state of said transportation device.

2. A portable electronic device for accompanying an asset that is in the process of being delivered to a given destination comprising:
    wireless signal detection circuitry operable to wirelessly identify a nearby wirelessly identifiable transportation device from signals received from an RF transmitter associated with a loading entry point of said transportation device;
    transmission circuitry operable to inform a remotely located data storage device that said electronic device is presently in proximity to a structure that is at least one of (a) a nearby wirelessly identifiable transportation device most recently identified, and (b) a nearby wirelessly identifiable transportation device in closest proximity;
    detection circuitry operable to determine when, subsequent to initial reception and detection of said at least one wireless signal specific to a nearby wirelessly identifiable transportation device, said electronic device is being moved toward and/or through a cargo loading entry point of said transportation device; and
    further circuitry operable to cause said transmission circuitry to inform the central station when said detection circuitry determines that said electronic device is being moved toward and/or through a cargo loading entry point of said wirelessly identifiable transportation device.

3. A computer implemented method of tracking a given asset that is accompanied by an electronic wireless signal identity reading device comprising:
    detecting wireless signals of nearby wireless signal identifiable structures;
    determining, via circuitry in said electronic wireless signal identity reading device, when said wireless signal identity reading device is within a given proximity to a wireless signal identifiable structure scheduled to proceed to a given destination;
    transmitting signals to a remotely located central station indicative of the identity of a recently detected wireless signal identifiable structure; and
    determining, via circuitry in said electronic wireless signal identity reading device, that the location of said given asset is identical with the location of a most recently detected and reported wireless signal identifiable structure until said central station receives a further signal directly from said electronic wireless signal identity reading device indicating that the electronic wireless signal identity reading device is one of (a) within a given proximity to a different wireless signal identifiable structure and (b) is at a location inconsistent with a presently determined location of the most recently reported wireless signal identifiable structure to which it was in proximity.

4. Apparatus for tracking an asset accompanied by an electronic wireless signal identity reading device while being transported by a wireless signal identifiable structure to a given destination comprising:
    central computer including data record maintaining circuitry;
    at least one electronic wireless signal identity reading device operable to detect wireless signal identifiable structures situated within a given proximity to said electronic wireless signal identity reading device;
    transceiver circuitry, comprising a part of said at least one electronic wireless signal identity reading device, operable to communicate with said central computer relative at least one of (a) the most recently detected wireless signal identifiable structure detected by said electronic wireless signal identity reading device and (b) a recently detected wireless signal identifiable structure that is in closest proximity;
    data storage circuitry operable to maintain a record of the identity of at least some of the wireless signal identifiable structures detected by any given electronic wireless signal identity reading device reporting to said central computer; and
    loading determination circuitry, comprising a part of said electronic wireless signal identity reading device, operable to communicate with said central computer data processed relative a determination by said at least one electronic wireless signal identity reading device that it is being transferred to a cargo area of said most recently detected wireless signal identifiable structure.

5. Apparatus as claimed in claim 4 wherein said structure is a transportation device and said central computer additionally comprises data receiving circuitry operable to record, in said data storage circuitry, whether the transport device to which an electronic wireless signal identity reading device is being transferred is a transport device previously scheduled for transportation of said electronic wireless signal identity reading device.

6. A computer implemented method of reducing transportation errors in the delivery of an asset to a given destination when a preferred schedule of transportation structures can be ascertained in advance comprising:
    coordinating the accompaniment of an electronic wireless signal identity reading device with the asset to be delivered to a given destination wherein the electronic wireless signal identity reading device is operable to detect wireless signal identifiable structures situated within a given proximity to said electronic wireless signal identity reading device;

communicating data, relative at least one of detected wireless signal identifiable structures in proximity to said electronic wireless signal identity reading device, to a central computer;

determining, by said electronic wireless signal identity reading device, that it is likely being transferred to an available area of a most recently detected wireless signal identifiable structure; and communicating between said electronic wireless signal identity reading device and said central computer that that said electronic wireless signal identity reading device has logically determined that it is being transferred to an available area of said most recently detected wireless signal identifiable structure.

7. The method as claimed in claim 6 comprising the additional steps of:

storing wireless signal identifiable structure data communicated to said central computer at least temporarily; and determining whether or not the structure to which an electronic wireless signal identity reading device is presently being transferred is a structure scheduled for at least one of transportation or temporary storage.

8. An electronic wireless signal identity reading device used to monitor associated cargo scheduled for transportation and/or storage via at least one predetermined and wireless signal identifiable structure comprising:

wireless signal receiving circuitry operable to detect and receive at least one wireless identifiable signal that is specific to a nearby wireless signal identifiable structure when said electronic wireless signal identity reading device is within a given proximity to said wireless signal identifiable structure;

storage circuitry operable to maintain a record of the identity of at least the last wireless identifiable signal detected from a nearby wireless signal identifiable structure;

determination circuitry, comprising part of said electronic wireless signal identity reading device, operational to determine when said electronic wireless signal identity reading device is in the process of being transferred to an available area of the last detected wireless signal identifiable structure; and transmission circuitry operable to transmit signals for informing a central station that said electronic wireless signal identity reading device is presently in the process of being transferred to an available area of the wireless signal identifiable structure having the identity last recorded by said storage circuitry.

9. Apparatus for continuously monitoring location of an asset accompanied by an electronic wireless signal identity reading and tracking device while in the process of being transported by a wireless signal identifiable structure to a given destination in accordance with a schedule maintained by at least one given entity controlling the operation of said wireless signal identifiable structure comprising:

a central computer operable to communicate with electronic wireless signal identity reading and tracking devices while simultaneously being operable to monitor the location of wireless signal identifiable structures of said given entity; and an electronic wireless signal identity reading and tracking device operable to wirelessly communicate with said central computer as to present location of said electronic wireless signal identity reading and tracking device along with being operable to report the proximity of nearby wireless signal identifiable structures controlled by said at least one given entity when the proximity is determined, via circuitry of said electronic wireless signal identity reading and tracking device, to be consistent with the process of being stored in an available area of and in proximity to said nearby wireless signal identifiable structure.

* * * * *